Nov. 28, 1950     F. A. GRUETJEN     2,532,225
BALANCE WEIGHT POSITIONER
Filed March 3, 1945     2 Sheets-Sheet 1
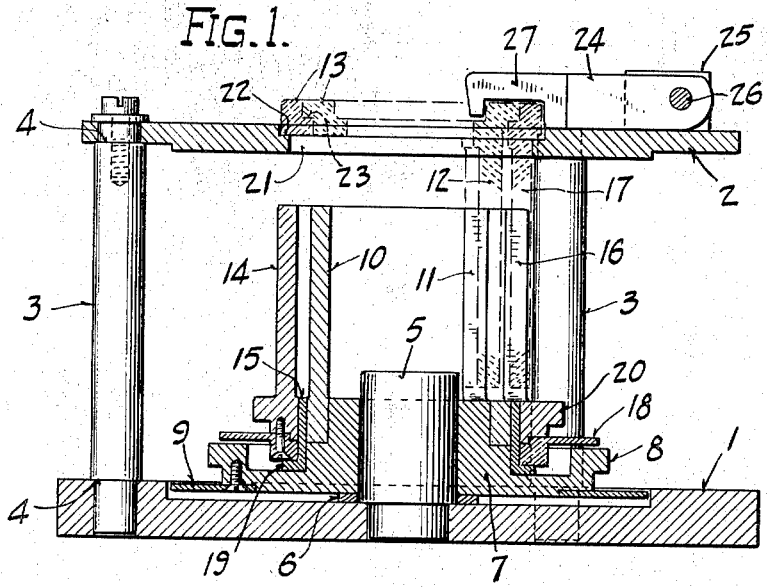
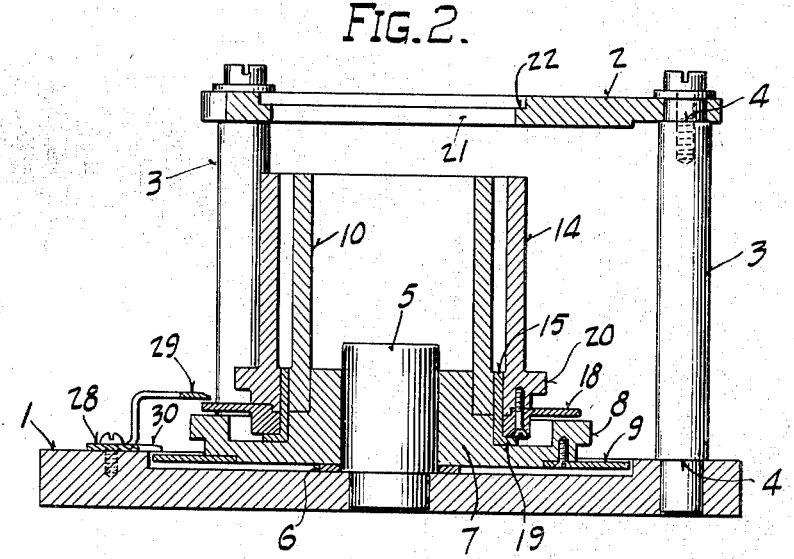
Frederick A. Gruetjen
INVENTOR.
BY
ATTORNEY.

Nov. 28, 1950     F. A. GRUETJEN     2,532,225
BALANCE WEIGHT POSITIONER
Filed March 3, 1945     2 Sheets-Sheet 2
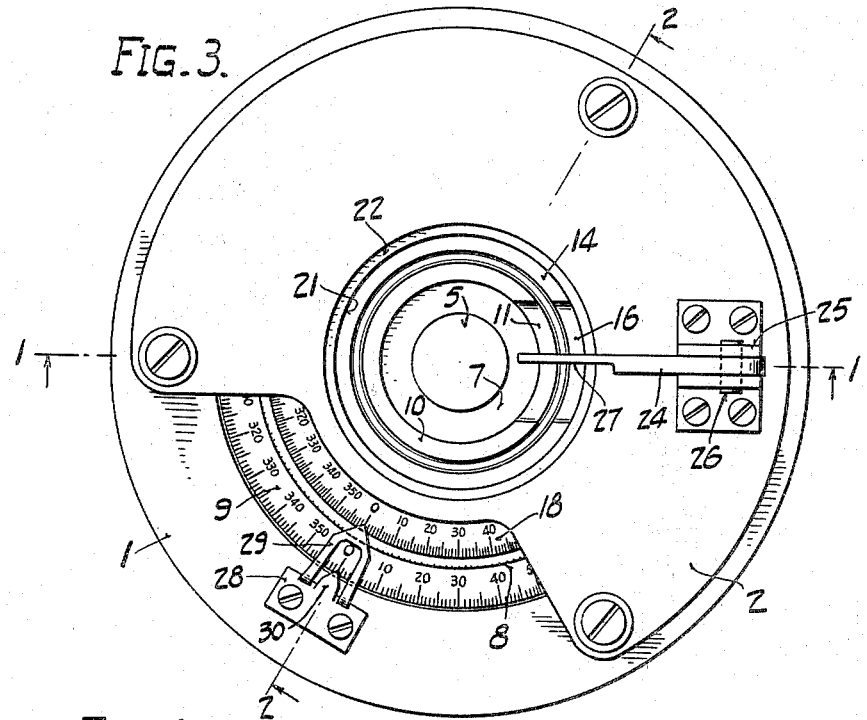
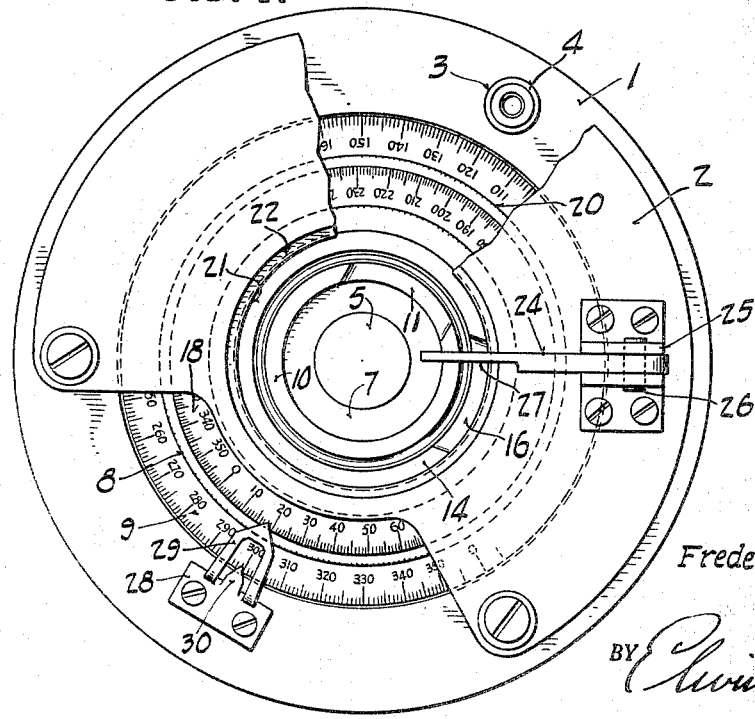
Frederick A. Gruetjen
INVENTOR.
BY
ATTORNEY.

UNITED STATES PATENT OFFICE 2,532,225

BALANCE WEIGHT POSITIONER

Frederick A. Gruetjen, Milwaukee, Wis., assignor to A. O. Smith Corporation, Milwaukee, Wis., a corporation of New York Application March 3, 1945, Serial No. 580,893

11 Claims. (Cl. 33—180)

This invention relates to a balance weight positioner and more particularly to a positioner fixture that may be employed to mark balance weights for location in proper relative position in a propeller blade and the like to effect vertical balance thereof.

The positioner finds particular employment in conjunction with the calculator device described and claimed in a co-pending application filed by the same inventor on March 3, 1945, entitled "Balance Weight Calculator," Serial No. 580,892. The latter device calculates the angular positions in which the balance weights must be placed to obtain the balance desired. The balance weight positioner of the present invention locates the weights in the determined angular position for marking on a line that corresponds to an index line through the apex of the trailing edge of the blade.

One object of the present invention is to provide a quick operating and accurate device for positioning balance weights and marking the same.

Another object is to provide a balance weight positioner that is readily portable from place to place.

A further object is to provide a balance weight positioner that may be employed with the calculator device described in the heretofore mentioned application of the same inventor and which calculates the angular positions at which the balance weight positioner of the invention is to locate the weights.

These and other objects of the invention appear hereinafter in connection with the description of an embodiment of the invention illustrated in the accompanying drawing.

In the drawing:

Figure 1 is a longitudinal sectional view of a balance weight positioner with balance weights shown by dotted lines taken on line 1—1 of Fig. 3;

Fig. 2 is a similar view taken on line 2—2 of Fig. 3;

Fig. 3 is a top plan view of the positioner; and

Fig. 4 is a view similar to Fig. 3 with parts broken away.

The balance weight positioner of the invention comprises in general a substantially circular base plate 1 separated from a substantially circular top plate 2 by a plurality of spacer pins 3 disposed between the outer circumference of the plates. Shoulders 4 on each end portion of pins 3 abut against the inside of the plates 1 and 2 to maintain them at a fixed distance from each other. Top plate 2 is cut away on one side thereof to facilitate use of the positioner as will be more fully described hereafter.

A stud 5 is secured within the center of base plate 1 and projects upwardly therefrom a substantial distance to receive the washer 6 and the collar 7, with washer 6 interposed between the base plate and collar.

Collar 7 is disposed for rotation around stud 5 and may have a knurled outer edge 8 to facilitate manipulation thereof. A disc 9 is secured by screws to a lower circumferential shoulder portion of collar 7 and projects outwardly a slight distance from knurled edge 8 for convenient reading of the markings on the disc, which is calibrated in a counterclockwise direction in one degree increments from zero to 360. Disc 9 is revolved by rotating collar 7 around stud 5.

The inner sleeve 10 is suitably secured onto the upper end portion of collar 7 and is revolved by disc 9 in the same manner as disc 9. Sleeve 10 extends upwardly from collar 7 to a line slightly removed from top plate 2 and is provided with a slot 11 extending longitudinally of the wall thereof to receive the projection 12 of one of the balance weights 13. Since the balance weights 13 form no part of this invention they are merely illustrated in dotted lines in the drawing.

In assembling the disc 9 and sleeve 10 with the collar 7, for convenience purposes only, as illustrated in the drawing, these parts are secured together in such a manner that the center line of slot 11 of the sleeve is 120 degrees to the right from the zero calibration of disc 9. This enables the disc to be read and the weights to be marked at different places on the fixture of the invention.

Inner sleeve 10 is separated from an outer sleeve 14 by bushing 15, the sleeve 14 being disposed for rotation around bushing 15. Sleeves 14 and 10 are rotatable relative to each other and sleeve 14 similarly to sleeve 10 is provided with slot 16 to receive the projection 17 of the other balance weight 13.

A disc 18 is suitably secured to the lower end shoulder portion of sleeve 14 and the outwardly turned flanged 19 provided at the lower end of bushing 15 separates the disc from collar 7 to permit relative rotation therebetween.

Disc 18 extends outwardly on a circumferential line slightly inwardly removed from the outer circumference of collar 7 so that collar 7 can be manipulated by the operator without effecting rotation of disc 18. As is the case with disc 9, disc 18 is calibrated in a counterclockwise direction in one degree increments from zero to 360 degrees.

Sleeve 14 is rotated by means of the knurled circumferential flange 20 disposed around the lower end portion of the sleeve but at a line above and inside the circumferential extent of disc 18 so as not to interfere with the reading of calibrations on the disc.

In assembling disc 18 with sleeve 14, for the purpose of convenient reading of the disc the center line of slot 16 in sleeve 14 is located at 120 degrees to the right from the zero mark on disc 18. The rotation of sleeve 14 by flange 20 effects rotation of disc 18 and the balance weight 13 carried by the sleeve.

Top plate 2 has a center opening 21 of slightly less diameter than that of outer sleeve 14 to permit insertion and removal of balance weights 13 from the slots in sleeves 10 and 14. The shoulder 22 around opening 21 provides a ledge to support the outer balance weight 13 which in turn supports the inner balance weight 13 by shoulder 23. The balance weights are rotated around center opening 21 and supporting shoulder 22 by movement of the sleeves 10 and 14 since the projections 12 and 17 of the weights are disposed in slots 11 and 16 respectively of the sleeves.

A marking bar 24 is disposed within bracket 25 suitably secured to the top of plate 2. Bar 24 extends over central opening 21 a sufficient distance to effect marking of the balance weights 13 after they have been rotated to the determined angular position. Bar 24 is pivoted in bracket 25 by pin 26 so that it can be moved downwardly to serve as a guide in marking the weights with any suitable marking instrument and upwardly to permit removal of the weights from the fixture.

Marking bar 24 has its marking edge 27 positioned radially at the 120° position of the dials at normal reading. In the illustration of the invention the operator marks the weights 13 on the left side of the marking bar 24 looking from the right in Fig. 3. The index line marked on the balance weights corresponds to a line through the apex of the trailing edge of the blade that is to be balanced.

A pointer bracket member 28 is suitably secured to the top of base plate 1 with its two pointers at a radial line of 0° normal setting and 120 degrees to the left of marking bar 24. A generally large pointer 29 of the bracket designates the calibrations on disc 18 and a smaller pointer 30 is disposed within pointer 29 and designates the calibrations on disc 9.

As is the case with the zero markings on the discs and the center line of slots 11 and 16 of sleeves 10 and 14, previously described, the manner of locating bracket 28 with its pointer members 29 and 30, to the left of marking bar 24, 120 degrees, effects convenient reading of the calibrations on discs 9 and 18. Manipulation and reading of the dials is facilitated by cutting away top plate 2 above bracket 28 as previously described. Ordinarily the marking bar would be located directly over the bracket 28 but this would increase the difficulties of reading the calibrations on the discs.

Fig. 3 illustrates the positioner in normal position with the pointer members 29 and 30 designating the zero marks on discs 18 and 9, respectively.

To illustrate the use of the positioner of the invention reference may be had to Fig. 4 of the drawings. Assume that it has been found as shown by Figure 1 of the "Balance Weight Calculator" of the present inventor previously referred to herein that to correct a determined unbalance, the inner balance weight 13 must be placed at about an angle of 299 degrees and the outer balance weight 13 must be placed at an angle of about 18 degrees from a given index point, reading in a counterclockwise direction.

The balance weights 13 are placed in the positioner with projection 12 of the inner weight disposed in slot 11 of sleeve 10 and the projection 17 of the outer weight disposed in slot 16 of sleeve 14.

By means of collar 7, disc 9 and sleeve 10 are rotated so that pointer 30 as shown in Fig. 4 indicates the 299 degree calibration on disc 9. Disc 18 and sleeve 14 are in turn rotated by means of flange 20 until the 18 degree calibration on disc 18 is at pointer 29 as illustrated in Fig. 4. The rotation of the discs to the determined degree markings locates balance weights 13 in the angular positions they should obtain to correct the determined unbalance of the blades within which they are to be inserted.

After positioning the weights in the manner described the weights are marked by any suitable marking instrument with portion 27 of marking bar 24 serving as a guide and the mark impressed on the weights corresponds to an index line through the apex of the trailing edge of the blade. This line also corresponds to the zero 180 degree line of the calculator device of the present inventor heretofore referred to. The weights are secured within the propeller blade with the index line of the weights falling on an index line through the apex of the trailing edge of the blade. If desired the weights may be soldered or otherwise secured together while in the fixture so that they can be assembled as a unit in the blade.

The positioner fixture of the invention provides a quick, accurate method for locating balance weights in the correct angular positions to correct determined vertical unbalance in a propeller blade or other rotary body after the angular positions have been calculated.

Various embodiments of the invention may be employed within the scope of the accompanying claims.

I claim:

1. A balance weight positioner for indexing balance weights to be placed in a rotary object for effecting vertical balance thereof where unbalance has been determined, comprising relative rotative members to receive separate balance weights and rotate the same relative to each other, means on said members to confine the weights and effect positive rotation of the weights by said members, calibrated means rotated by said rotative members to determine the positioning of the weights in proper angular relation to correct the determined unbalance and means for indexing the weights in said angular position.

2. A balance weight positioner for indexing balance weights to be placed in a rotary object for effecting vertical balance thereof where unbalance has been determined, comprising relatively rotative members to receive the corresponding balance weights to rotate the same, calibrated means rotated by said rotative members to defined positions to indicate when the weights are in the proper angular position to correct the determined unbalance, and a guide member to serve as an index for marking the weights when the same are located in the defined angular position necessary to correct determined unbalance.

3. A balance weight positioner for indexing balance weights to be placed in a rotary object for effecting vertical balance thereof where unbalance has been determined, comprising means to hold and relatively rotate said weights, calibrated discs relatively rotated by said means to defined calibrations for disposing the weights in the proper angular position to correct the determined unbalance, and a guide member to serve as an index for marking the weights when the same are located in the defined angular position.

4. A balance weight positioner for indexing balance weights to be secured in a propeller blade for effecting vertical balance thereof where unbalance has been determined, comprising an inner sleeve disposed for rotation and having a longitudinal slot therein to receive an eccentric balance weight to rotate the same, and an outer sleeve disposed for rotation and having a longitudinal slot therein to receive another eccentric balance weight to rotate the same, said sleeves having indexing marks to indicate the angular positions the weights are to be rotated to by their respective sleeves to correct the determined unbalance.

5. A balance weight positioner for indexing balance weights to be secured in a propeller blade for effecting vertical balance thereof where unbalance has been determined, comprising an inner sleeve disposed for rotation and provided to receive an eccentric balance weight to rotate the same, an outer sleeve disposed for rotation and provided to receive another eccentric balance weight to rotate the same, said sleeves having indexing marks to indicate the angular positions the weights are to be rotated to by their respective sleeves to correct the determined unbalance, and a guide member to serve as an index for marking the weights when the same are located in the defined angular position.

6. A balance weight positioner for indexing balance weights to be secured in a propeller blade for effecting vertical balance thereof where unbalance has been determined, comprising an inner sleeve disposed for rotation and provided to receive a balance weight to rotate the same, an outer sleeve disposed for rotation and provided to receive another balance weight to rotate the same, a separate disc secured to each sleeve and rotated thereby, the discs being calibrated to index the defined angular positions the weights are to be placed to correct the determined unbalance, and a guide member to serve as an index for marking the weights when the same have been located in the defined angular position.

7. A balance weight positioner for indexing balance weights to be secured in a propeller blade for effecting vertical balance thereof where unbalance has been determined, comprising inner and outer sleeves disposed for relative rotation and having longitudinal slots to receive balance weights to rotate the same, calibrated discs secured to the lower end portions of each of said sleeves with the calibrations on said discs being in increments of one degree from zero to 360, and means on said sleeves to rotate the sleeves and discs to a defined calibration on each disc to angularly position the weights and index the same for disposal within the blade to correct the determined unbalance.

8. A balance weight positioner for locating and indexing balance weights in a determined angular position, comprising a base plate and a top plate spaced apart a fixed distance, a cylinder secured to the center of the base plate and extending upwardly therefrom, a collar disposed for rotation round said cylinder, an inner sleeve secured to the upper end portion of the collar and disposed to receive one of the balance weights, a disc secured to the lower end portion of the collar and calibrated with degree marks to indicate the determined angular position of said balance weight, an outer sleeve to receive another balance weight and disposed to rotate relative to the inner sleeve, a disc secured to the lower end portion of the outer sleeve and calibrated with degree markings to indicate the determined angular position of said second balance weight, and a marking bar provided on the top plate of the positioner to serve as a guide for marking the weights for location in a propeller blade after they have been rotated to the determined angular positions defined by said discs.

9. A balance weight positioner for locating and indexing balance weights in a determined angular position, comprising a base plate and a top plate with the latter cut away on one side and having an opening in the central portion thereof, a cylinder secured to the center of the base plate and extending upwardly therefrom, a collar disposed for rotation around said cylinder, an inner sleeve secured to the upper end portion of the collar and having a longitudinal slot therein to receive one of the balance weights, a disc secured to the lower end portion of the collar and calibrated with degree markings to indicate the determined angular position of said balance weight, an outer sleeve having a longitudinal slot therein to receive another of the balance weights and disposed to rotate relative to the inner sleeve, a disc secured to the lower end portion of the outer sleeve and calibrated with degree markings to indicate the determined angular position of said second balance weight, and a marking bar provided on the top plate of the positioner to serve as a guide for marking the weights for location in a propeller blade after they have been rotated to the determined angular positions defined by said discs.

10. A balance weight positioner for indexing balance weights to be secured in a propeller blade for effecting vertical balance thereof where unbalance has been determined, comprising an inner sleeve disposed for rotation and having a longitudinal slot therein to receive a balance weight, an outer sleeve disposed for rotation and provided with a longitudinal slot to receive another of the balance weights, and discs secured to each sleeve and rotated thereby with the discs calibrated from zero to 360 degrees to provide an index for locating the defined angular positions the weights are to be placed to correct the determined unbalance, the said discs being secured to said sleeves in such a manner that the zero marks on the discs are displaced from the center line of the longitudinal slots of the sleeves to facilitate reading of the discs.

11. A balance weight positioner for positioning and indexing balance weights to effect vertical balance of a propeller blade where unbalance has been determined, comprising plate members spaced apart a fixed distance, inner and outer sleeves provided between the plate members and with each sleeve having a slot to receive a balance weight and rotate the same, a disc secured to each sleeve to be rotated thereby and calibrated with degree markings from zero to 360, the zero marking on each disc being removed from a line through the center of the slot in the sleeve to which the respective disc is secured, an index indicating bracket secured to one of the plate members and having pointers disposed to designate the degree marks on each of said discs, and an index marking bracket secured to the other plate member, the said brackets being secured to the plate members the same number of degrees apart as the distance between the zero mark on each disc and a line through the center of the respective sleeve to which the disc is secured.

FREDERICK A. GRUETJEN.

REFERENCES CITED

The following references are of record in the file of this patent:

UNITED STATES PATENTS

| Number | Name | Date |
|---|---|---|
| 692,060 | McCormick | Jan. 28, 1902 |
| 757,335 | McCroskey | Apr. 12, 1904 |
| 1,521,117 | Miller | Dec. 30, 1924 |